(12) United States Patent
Majmudar et al.

(10) Patent No.: US 8,999,885 B2
(45) Date of Patent: Apr. 7, 2015

(54) METHODS OF ACTIVATING CHARCOAL RESULTING FROM BIOMASS GASIFICATION

(71) Applicant: General Electric Company, Schenectady, NY (US)

(72) Inventors: Jinmesh Pranav Majmudar, Gujarat (IN); Omprakash Mall, Odisha (IN)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 13/737,718

(22) Filed: Jan. 9, 2013

(65) Prior Publication Data

US 2014/0194284 A1  Jul. 10, 2014

(51) Int. Cl.
*C01B 31/08* (2006.01)
*B01J 20/30* (2006.01)

(52) U.S. Cl.
CPC .................................. *B01J 20/3078* (2013.01)

(58) Field of Classification Search
CPC ................................ C01B 31/08; C01B 31/10
USPC .................................................. 502/421, 430
See application file for complete search history.

(56) References Cited

U.S. PATENT DOCUMENTS

| 4,987,115 | A | * | 1/1991 | Michel-Kim | 502/419 |
| 5,187,141 | A | * | 2/1993 | Jha et al. | 502/432 |
| 5,723,717 | A | * | 3/1998 | Kiss | 423/220 |
| 6,316,378 | B1 | | 11/2001 | Giebelhausen et al. | |
| 6,558,644 | B1 | * | 5/2003 | Berman | 423/445 R |
| 6,669,822 | B1 | * | 12/2003 | Fujimura et al. | 201/37 |
| 7,888,540 | B2 | | 2/2011 | Deluga et al. | |
| 2003/0000822 | A1 | | 1/2003 | Antonenko et al. | |

FOREIGN PATENT DOCUMENTS

| EP | 0631981 A1 | 1/1995 |
| WO | 9909115 A1 | 8/1998 |

* cited by examiner

*Primary Examiner* — Stuart Hendrickson
(74) *Attorney, Agent, or Firm* — Armstrong Teasdale LLP

(57) ABSTRACT

Methods for activating charcoal resulting from biomass gasification are provided. Exemplary methods include gasifying biomass in a gasification reactor of an integrated biomass gasification system to produce charcoal; and activating charcoal using heat generated from an integral heat source of the integrated biomass gasification system. The methods include activation of charcoal resulting from biomass gasification in a more efficient, economical manner, thereby increasing the value of biomass gasification with minimal investment in the process.

17 Claims, 2 Drawing Sheets

METHODS OF ACTIVATING CHARCOAL RESULTING FROM BIOMASS GASIFICATION

BACKGROUND OF THE INVENTION

The present disclosure relates generally to methods for activating carbon charcoal and, more particularly, to activating carbon charcoal resulting from biomass gasification without the use of an external heat source, heat treatment, and/or heat recovery.

At least some known gasification systems are integrated with at least one power producing turbine system. Many of such systems include a gasifier that creates a combustible gas or a combustible gas precursor, that undergoes additional processing into a combustible gas, referred to as "producer gas". One common source of producer gas or precursor feedstock is biomass material, as the use of biomass material reduces the dependency on other sources of producer gas feedstock, such as fossil fuel-based feedstocks including coal, and/or coke, for example.

In use, the gasifier creates producer gas through a pyrolysis reaction, whereby air is injected into the gasifier to completely burn the biomass material to charcoal. The charcoal may then be activated and used for decolorization purposes, purification of gases, adsorption of vapors, and purification of water, for example. Conventionally, activation of charcoal is typically accomplished via chemical or physical/thermal processes. For example, in thermal activation, an external heat source (e.g., a burner, or a reactor) heats the carbon-based charcoal material, thereby burning the carbon and increasing its porosity.

This activation process can increase the marketable value of charcoal when compared to inactivated charcoal. Accordingly, it would be advantageous to provide alternative methods for activating the charcoal resulting from biomass gasification that are more efficient and economical. More particularly, it would be desirable to utilize heat generated internally within the biomass gasification system to activate charcoal, thereby increasing the value of biomass gasification with minimal investment in the process.

BRIEF DESCRIPTION OF THE INVENTION

In one aspect, a method of activating charcoal resulting from gasification is provided. The method includes gasifying dried biomass material in a gasification reactor of an integrated biomass gasification system to produce charcoal, and activating the charcoal using heat generated from an integral heat source of the integrated biomass gasification system.

In another aspect, a method of activating charcoal resulting from gasification is provided. The method includes gasifying dried biomass material in a gasification reactor of an integrated biomass gasification system to produce a stream of charcoal and producer gas, separating the charcoal from the producer gas of the stream using a hot screw conveyor, and activating the charcoal using heat generated from an integral heat source of the integrated biomass gasification system.

In another aspect, a method of activating charcoal resulting from gasification is provided. The method includes gasifying dried biomass material in a gasification reactor of an integrated biomass gasification system to produce a stream of charcoal and producer gas, separating the charcoal from the producer gas of the stream using a hot screw conveyor, combusting the producer gas using a combustor to generate hot exhaust gases, and activating the charcoal using heat from the hot exhaust gases.

DETAILED DESCRIPTION OF THE INVENTION

Although specific features of various exemplary embodiments of the invention may be shown in some drawings and not in others, this is for convenience only. In accordance with the principles of the invention, any feature of a drawing may be referenced and/or claimed in combination with any feature of any other drawing.

The present invention is directed to an integrated biomass gasification system capable of using heat produced within the system to activate charcoal. This system includes an integral heat source for heating charcoal resulting from the biomass gasification reactor of the system, thereby increasing its iodine value to a level that may be useful as activated carbon in industries such as for purification and/or decolorization of water and vapors, for example. In some embodiments, As used herein, the terms "integral heat source" and "integrated heat source" are used interchangeably to refer to an internal component of the integrated biomass gasification system that is incorporated for a primary purpose other than to heat and activate charcoal resulting from the system.

In the exemplary embodiment, activation of charcoal occurs either chemically or thermally. Thermal, also known as physical, activation occurs after heating the charcoal material to a temperature where the carbon is at least partially burned, and where its porosity is increased. Typically, charcoal is activated at a temperature of at least 400° C.

Figure 1:
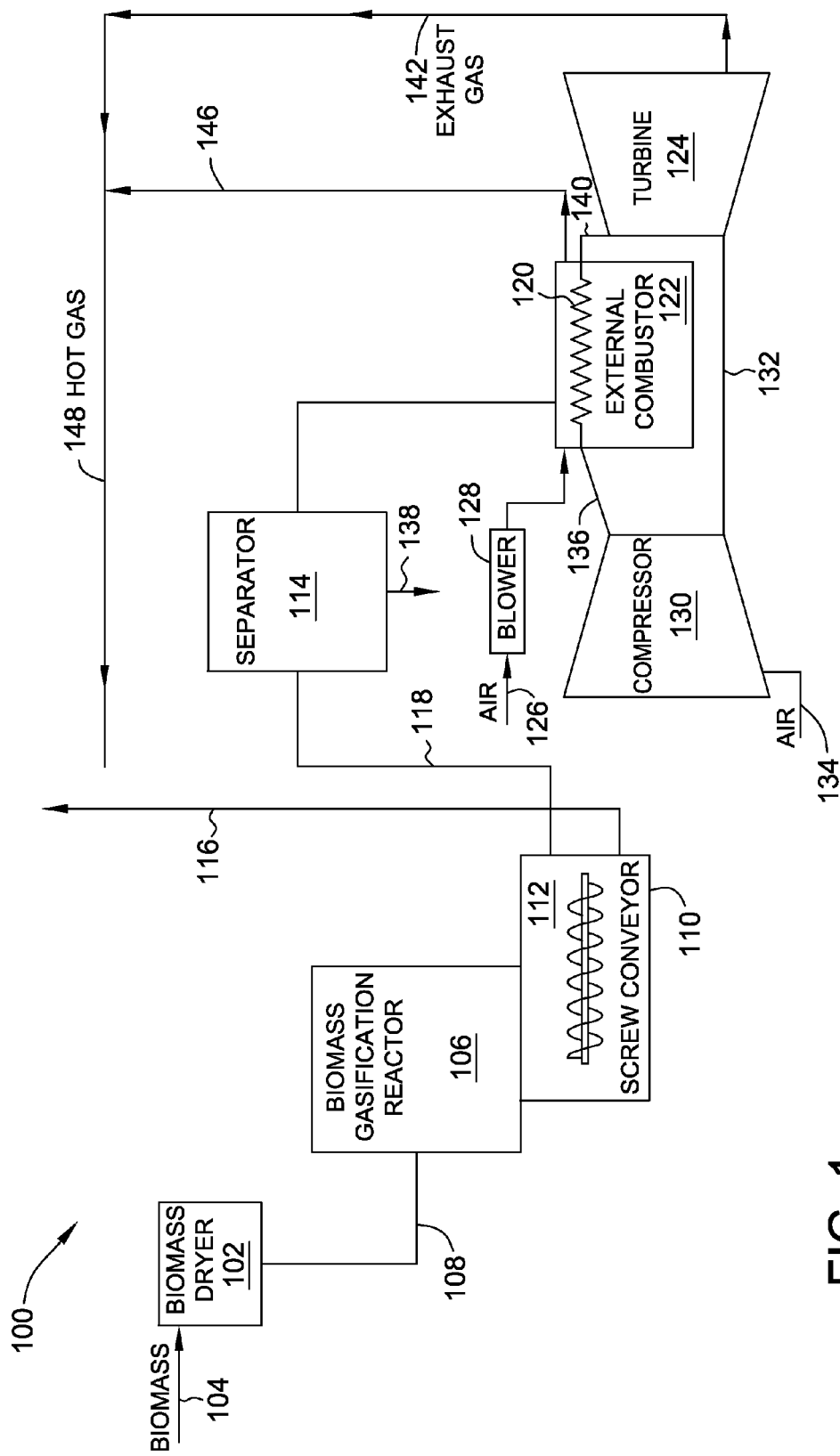
FIG. 1 is a schematic diagram of an exemplary system for use in activating charcoal resulting from an integrated biomass gasification system using heat from an integral heat source.

FIG. 1 is a schematic diagram of an exemplary integrated biomass gasification system 100 that may be used in generating charcoal for activation. In the exemplary embodiment, System 100 includes a biomass dryer 102 that receives biomass material from a source 104. A biomass gasification reactor 106, also referred to herein as a gasifier, receives dried biomass material 108 from biomass dryer 102. Biomass dryer 102 may be any dryer known in the art, such as, but not limited to, rotary dryers, flash dryers, superheated steam dryers, disk dryers, and/or cascade dryers. Alternatively, in some embodiments, dried biomass material 108 is produced by sun-drying. Dried biomass material 108 typically includes less than 12% by weight moisture and includes approximately 6% by weight charcoal.

Once dried, dried biomass material 108 is conveyed to biomass gasification reactor 106 for gasification. Biomass gasification reactor 106 is coupled to a hot screw conveyor 112, wherein a stream (not shown) produced by gasifier 106 is separated to remove solids such as charcoal 116 from producer gas 118. After separation from hot screw conveyor 112, charcoal 116 has a temperature of approximately 200° C. Charcoal 116 may be subsequently treated with an acid wash, such as with hydrogen chloride (HCl).

In one embodiment, charcoal 116 can contact outer walls 110 of screw conveyor 112, heating charcoal 116 to a temperature of between 400° C. to about 1100° C., such that charcoal 116 is activated.

Producer gas 118 is then channeled into a separator 114, such as a cyclone separator, in which particulate matter 138 is separated from producer gas 118. The temperature of producer gas 118 channeled to separator 114 is typically about 500° C. Accordingly, in one embodiment, heat from producer gas 118 can be used for heating, and thereby activating, charcoal 116 through either air heating or through steam generation as is known in the art.

It should be understood that although separator 114 is described herein as a cyclone separator, any other separator known in the gasification art may be used in system 100 without departing from the present invention. Producer gas 118 is comprised primarily of hydrogen ($H_2$), carbon dioxide ($CO_2$) and carbon monoxide (CO). Producer gas 118 is channeled into a combustor 122, wherein producer gas 118 is combusted with air 126, typically ambient air, supplied by a blower 128. As used herein, the term "blower" refers to a device that primarily serves to propel a fluid while raising its pressure only slightly, whereas a "compressor" refers to any device that discharges a fluid at a significantly higher pressure than the pressure of fluid introduced into the compressor. As used herein, "pressurized" refers to a fluid having a higher pressure than a "compressed" fluid. Combustor 122 discharges a combustor exhaust 146. Combustor 122 includes a heat exchanger element 120, that is coupled in flow communication with a compressor 130 and a turbine 124. Compressor 130 is rotationally coupled to turbine 124 via a transmission structure 132.

Ambient air 134 is channeled into compressor 130. Compressor 130 discharges a heated compressed air 136 that is channeled into combustor 122. Combustor 122 discharges a heated pressurized air 140, that is channeled towards turbine 124, and that is subsequently discharged from turbine 124 as an exhaust 142. Heated pressurized air 140 is expanded in turbine 124, causing rotation of turbine 124. Turbine exhaust 142 is combined with combustor exhaust 146 to produce hot gases 148 that can be used to heat charcoal 116. In one embodiment, gases 148 can heat charcoal 116 to a temperature of between about 400° C. to about 1100° C., thereby activating charcoal 116.

Figure 2:
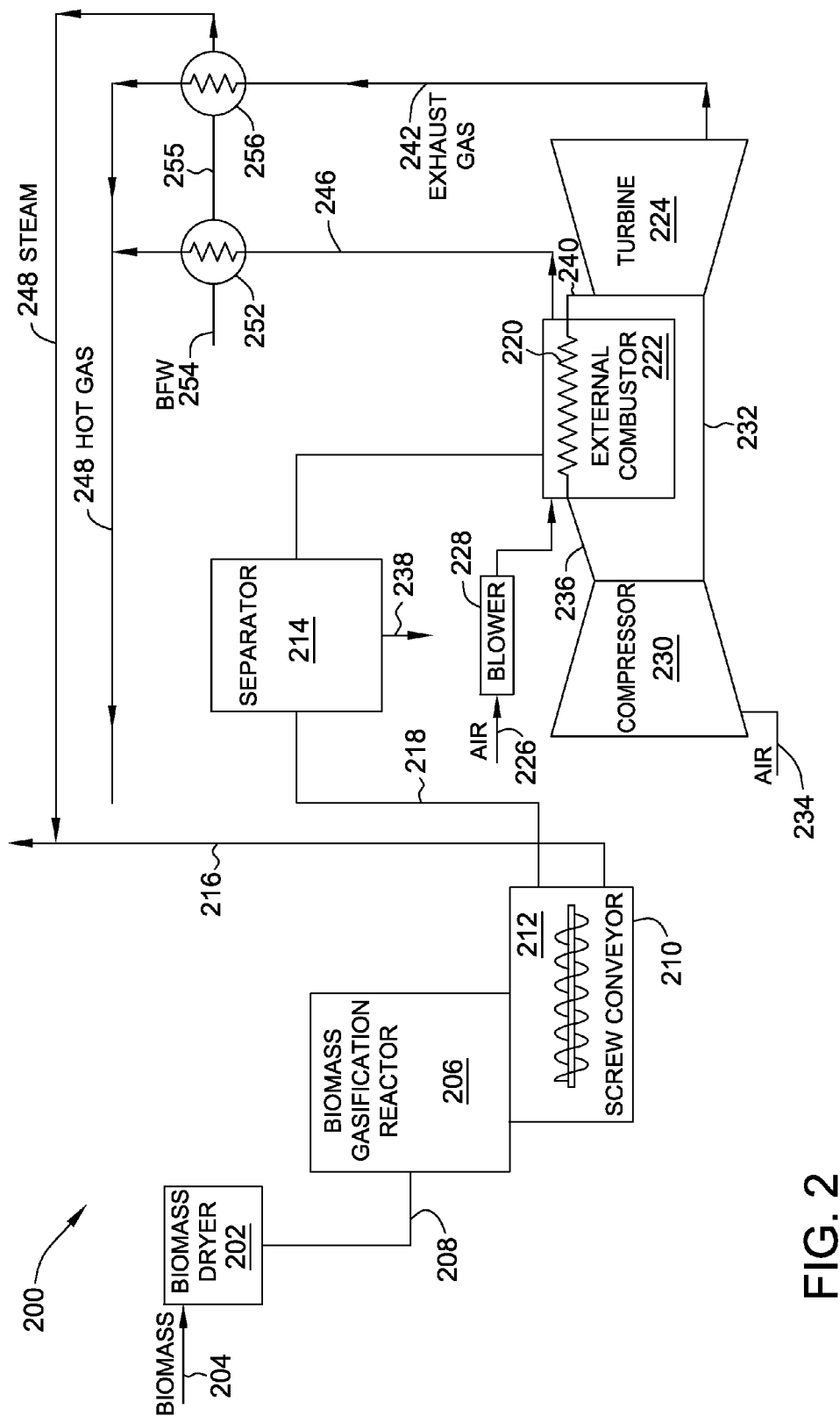
FIG. 2 is a schematic diagram of an alternative system for use in activating charcoal resulting from an integrated biomass gasification system using heat from an integral heat source.

FIG. 2 is a schematic diagram of an alternative integrated biomass gasification system 200 for use in generating charcoal for activation. In the exemplary embodiment, system 200 includes a biomass dryer 202, that receives biomass material from a source 204. A biomass gasification reactor 206 receives dried biomass material 208 from biomass dryer 202 for gasification. Similar to dryer 102 (shown in FIG. 1) used with system 100 (shown in FIG. 1), biomass dryer 202 may be any dryer known in the art. Alternatively, dried biomass material 208 may be produced by sun-drying.

Biomass gasification reactor 206 is coupled to a hot screw conveyor 212, wherein a stream (not shown) produced by biomass gasification reactor 206 is separated to remove solids including charcoal 216, from producer gas 218. Similar to system 100, charcoal 216 in system 200 may contact outer walls 210 of screw conveyor 212, thereby heating charcoal 116 to a temperature sufficient for activation (i.e., between about 400° C. to about 1100° C.).

Similar to system 100, producer gas 218 generated in system 200 may be channeled to separator 214, such as a cyclone separator, in which particulate matter 238 is separated from producer gas 218. Further, as the temperature of producer gas 218 is typically about 500° C., heat from producer gas 218 can be used for heating, and to thereby activate, charcoal 216 through either air heating or steam generation.

Producer gas 218 is channeled into a combustor 222, wherein the producer gas 218 is combusted with air 226 (typically ambient air) supplied by a blower 228. Combustor 222 discharges a combustor exhaust 246. Combustor 222 includes a heat exchanger element 220, that is coupled in flow communication with compressor 230 and turbine 224. Compressor 230 is rotationally coupled to turbine 224 via a transmission structure 232.

Ambient air 226 is channeled into compressor 230. Compressor 230 discharges a compressed air 236 that is channeled into combustor 222. Combustor 222 discharges a heated pressurized air 240, that is channeled towards turbine 224 prior to it subsequently being discharged from turbine 224 as exhaust 242. Heated pressurized air 240 is expanded in turbine 224, causing rotation of turbine 224.

Combustor 222 is coupled in flow communication with heat exchanger 252. Combustor exhaust 246 is channeled to heat exchanger 252 to release heat to a boiler feed water (BFW) 254, creating a heated boiler feed water 255. Heated boiler feed water 255 is channeled to a heat exchanger 256 coupled in flow communication with combustor 222, wherein heated boiler feed water 255 is heated additionally by turbine exhaust 242, and is converted into a steam 258. Steam 258 may be used to heat charcoal 216 to a temperature between about 400° C. to about 1100° C., to activate charcoal 216.

Alternatively, similar to system 100, turbine exhaust 242 generated in system 200 may be combined with combustor exhaust 246 to produce hot gases 248 that can be used to heat charcoal 216. In one embodiment, hot gases 248 can heat charcoal 216 to a temperature of between about 400° C. to about 1100° C., thereby activating charcoal 216.

In contrast to known integrated biomass gasification systems, the biomass gasification systems described herein enable charcoal resulting from biomass gasification to be activated thermally using heat from an integral heat source; more specifically, the systems described herein facilitate activating charcoal without the use of an external heat source. The biomass gasification systems facilitate the activation of charcoal resulting from biomass gasification in a more efficient and economical manner, thereby increasing the value of biomass gasification with minimal investment in the process. The activated charcoal may be used in many industries, such as, for example, decolorization purposes, purification of air and gases, adsorption of vapors, and/or purification of water.

Exemplary embodiments of methods for activating charcoal resulting from biomass gasification are described herein in detail. The methods and systems are not limited to the specific embodiments described herein, but rather, components of systems and/or steps of the methods may be utilized independently and separately from other components and/or steps described herein. For example, the methods and systems described herein may also be used in combination with other power generation schemes, and are not limited to practice with only the components as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. A method of activating charcoal resulting from gasification, said method comprising:
   gasifying dried biomass material in a gasification reactor of a biomass gasification system to produce unactivated charcoal; and
   activating the unactivated charcoal to facilitate increasing an iodine value of the unactivated charcoal using heat generated from an integral heat source of the biomass gasification system,
      wherein the biomass gasification system also includes a combustor and a turbine in flow communication with the gasification reactor, said method further comprises contacting the biomass material with at least one of turbine exhaust and combustor exhaust.

2. The method in accordance with claim 1 further comprising drying the biomass material using a dryer.

3. The method in accordance with claim 1 further comprising sun-drying the biomass material.

4. The method in accordance with claim 1, wherein activating the unactivated charcoal comprises heating the unactivated charcoal to a temperature of from about 400° C. to about 1100° C.

5. The method in accordance with claim 4, wherein the biomass gasification system further includes a combustor and a turbine in flow communication with the gasification reactor, said method further comprises heating the unactivated charcoal with at least one of turbine exhaust and combustor exhaust.

6. The method in accordance with claim 4, wherein the biomass gasification system further includes a hot screw conveyor coupled to the gasification reactor, said method further comprises heating the unactivated charcoal with outer walls of the hot screw conveyor.

7. The method in accordance with claim 4, wherein the biomass gasification system further includes a combustor in flow communication with the gasification reactor and a heat exchanger in flow communication with the combustor, said method further comprises heating the unactivated charcoal with steam generated by the heat exchanger.

8. A method of activating charcoal resulting from gasification, said method comprising:
   gasifying dried biomass material in a gasification reactor of a biomass gasification system to produce a stream of unactivated charcoal and producer gas;
   separating the unactivated charcoal from the producer gas of the stream using a hot screw conveyor; and
   activating the unactivated charcoal to facilitate increasing an iodine value of the unactivated charcoal using heat generated from an integral heat source of the biomass gasification system,
      wherein the biomass gasification system further includes a turbine in flow communication with a combustor, said method further comprises heating the unactivated charcoal with turbine exhaust.

9. The method in accordance with claim 8, wherein activating the unactivated charcoal comprises heating the unactivated charcoal to a temperature of from about 400° C. to about 1100° C.

10. The method in accordance with claim 9, wherein activating the unactivated charcoal comprises heating the unactivated charcoal with the producer gas at a temperature of about 500° C., wherein activating occurs subsequent to separating the unactivated charcoal from the producer gas.

11. The method in accordance with claim 9 further comprising combusting the producer gas in the combustor to generate combustor exhaust, wherein the unactivated charcoal is activated by heating the unactivated charcoal with the combustor exhaust.

12. The method in accordance with claim 9, wherein the biomass gasification system further includes a combustor in flow communication with the gasification reactor and a heat exchanger in flow communication with the combustor, said method further comprises heating the unactivated charcoal with steam generated by the heat exchanger.

13. A method of activating charcoal resulting from gasification, said method comprising:
   gasifying dried biomass material in a gasification reactor of a biomass gasification system to produce a stream of unactivated charcoal and producer gas;
   separating the unactivated charcoal from the producer gas of the stream using a hot screw conveyor;
   combusting the producer gas using a combustor to generate hot exhaust gases wherein combusting the producer gas comprises generating combustor exhaust and turbine exhaust, wherein the combustor exhaust and the turbine exhaust are combined to generate the hot exhaust gases; and
   activating the unactivated charcoal to facilitate increasing an iodine value of the unactivated charcoal using heat from the hot exhaust gases.

14. The method in accordance with 13 further comprising sun-drying the biomass material.

15. The method in accordance with claim 13, wherein activating the unactivated charcoal comprises heating the unactivated charcoal to a temperature of at least about 400° C.

16. The method in accordance with claim 13, wherein activating the unactivated charcoal comprises heating the unactivated charcoal to a temperature of from about 400° C. to about 1100° C.

17. The method in accordance with claim 13, wherein activating the unactivated charcoal comprises heating the unactivated charcoal without the use of an external heat source.

* * * * *